Sept. 15, 1925.

P. D. THIBERT

LOCK NUT

Filed March 1, 1924

1,553,576

Inventor:
Paul D. Thibert
By Southgate & Southgate
Attorney

Patented Sept. 15, 1925.

1,553,576

UNITED STATES PATENT OFFICE.

PAUL D. THIBERT, OF SPRINGFIELD, MASSACHUSETTS.

LOCK NUT.

Application filed March 1, 1924. Serial No. 696,342.

*To all whom it may concern:*

Be it known that I, PAUL D. THIBERT, a citizen of the United States, residing at Springfield, in the county of Hampden and State of Massachusetts, have invented a new and useful Lock Nut, of which the following is a specification.

This invention relates to a lock nut of the type in which a spring surrounds the nut and is provided with a point or tooth on the end acting on the screw thread of the bolt as a ratchet tooth.

The principal objects of the invention are to provide for locking the spring in the body of the nut in such a way as to avoid any reduction in the length of the nut and also avoid any necessity for manufacturing the nut longer than the standard thickness in order to provide for the location of the wire or other spring; to provide for locating the spring exactly in the right position and seating it so that it can be removed and replaced easily; to provide for concealing the locking parts and protecting them from the weather; and to provide a nut which will lock on the thread at the first turn, even if the bolt projects into the nut only that far.

Reference is to be had to the accompanying drawings in which

Figure 2:
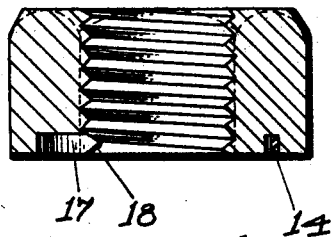
Fig. 2 is a sectional view on the line 2—2 of Fig. 1.

I have shown the invention as applied to a standard hex nut or it can be used for any other kind. Preferably this nut is made of the standard dimensions. It is provided with a complete longitudinal circular groove 11 in the bottom face or end of the nut of cylindrical shape inside and out and located at a considerable distance from the screw-threaded hole 12 through the nut which it surrounds. In fact this circular groove is made as near the edge of the nut as possible without cutting through the edge so that there is a wall of metal inside it on which the screw thread of the nut is cut. At some convenient place in the lower surface of the nut a passage 13 is milled through from the groove 11 to the hole 12 and having a depth equal to the depth of the groove 11 which is about equal to the pitch of the thread. The end surface of the nut inside the groove is in the same plane as it is outside.

Within the groove 11 is placed a circular wire spring 14. This is bent inwardly at the end at 15 to press close against the angle made by the meeting walls of the groove and passage and prevent backward motion. At the other end the spring 14 is provided with an end 17 offset inwardly and having a sharp edge 18 constituting a tooth. This tooth 18 engages the screw thread of the bolt on which the nut is to be used, and acts as a ratchet to prevent the nut unscrewing. It will be understood that this spring 14 does not entirely fill the groove, but is spaced from the interior wall to allow for a little play. The groove is a little deeper than the depth of the spring. The passage 13 is wide enough to give considerable play to the end 17 but the bend 15 prevents any material circumferential creeping of the spring.

It will be observed that the spring 14 and its offset projection 17 are located in a plane within the body of the nut and that the end of the nut is of the same shape as ordinary nuts, and for that reason the thickness of the nut does not have to be changed in any way.

The nut can be made in accordance with this invention having the thickness of a standard nut and capable of being used in every place where a standard nut is used. The nut is made on an automatic machine for that purpose, preferably, and provided with the groove 11 in the course of manufacture without increasing in any way the expense of manufacture. After the nut is made and taken out of the machine, the passage 13 is made by a separate milling operation, and this is all the additional work that is required. The springs are made in a very rapid and inexpensive manner and can be introduced into the grooves with great rapidity.

When the nut is screwed up on a bolt the tooth 18 offers no resistance to the right-hand motion. Whenever it is attempted to move it backwards or unscrew it, this tooth will be forced in against the screw thread and acts as a ratchet to prevent the operation. When it is desired to remove the nut that can be done very easily by introducing a nail or screw-driver into the passage 13 and forcing it against the lower or inner surface of the projecting end 17 to bring the tooth 18 back out of contact with the screw-thread. This is also an important feature of the device, because it permits of the ready removal of the nut and the wall of the passage 13 gives a purchase for the tool or nail to permit ready detachment.

By placing the locking spring on the bottom of the nut it will act on the first or any other thread of the bolt and it is fully effective if the bolt does not project all the way through the nut. The spring is also protected from the elements and from tampering. It is unlocked by a mere turn of the wrench which forces back the latching tooth which can be turned back several times in its original place without spoiling the spring.

There are cases in which it is not desired to allow a nut to screw up on the bolt beyond a certain point because it would bind some other element and prevent the parts working freely. When it is desired to accomplish this result a double construction can be used, as shown in Fig. 3. Here the spring on the bottom of the nut is arranged and operates as in Figs. 1 and 2. The nut is screwed up as far as it is desired to have it go with the bottom spring in. It is obvious therefore that while the nut will not unscrew it is capable of screwing up further. After it is in this position the spring on top of the nut is introduced but put on backwards to engage the thread of the bolt near the end. This prevents the nut screwing up and the bottom spring prevents it unscrewing.

Figure 1:
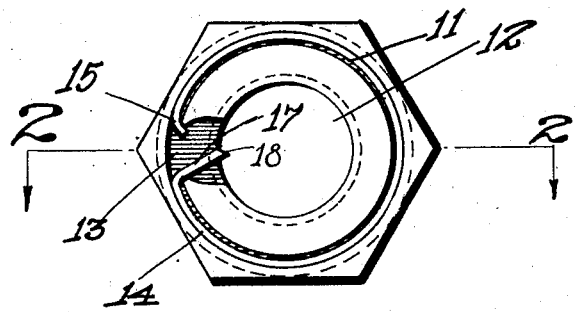
Fig. 1 is a bottom plan of a nut constructed in accordance with this invention.
Figure 3:
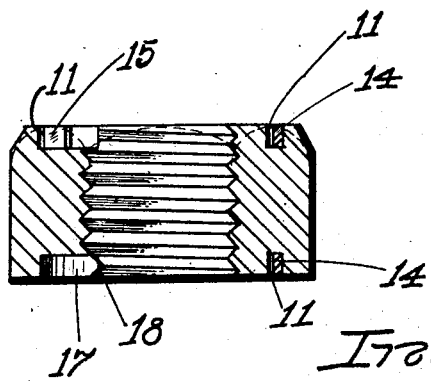
Fig. 3 is a similar view of a modification.

It is also possible wherever desired to use both springs arranged in the same way as in Figs. 1 and 2 so as to have the effect of two springs to prevent the unscrewing of the nut. In this case when it is desired to take the nut off, the spring on top is taken out, thus reducing the resistance to unscrewing it.

Although I have illustrated and described only two forms of the invention, I am aware of the fact that other modifications can be made therein by any person skilled in the art without departing from the scope of the invention as expressed in the claim.

Therefore I do not wish to be limited to all the details of construction herein shown and described, but what I do claim is:—

As an article of manufacture, a lock nut having two complete circular grooves, one in its bottom face and the other in its top face, both located at a distance from the central threaded hole of the nut and each provided with a radial passage from the groove to said hole, and a pair of springs located in said grooves each having an inwardly projecting end extending through the respective passage into a position to contact with the screw thread of the bolt, one of said springs being located in such position as to prevent the unscrewing of the nut and the other being located in such position to prevent the screwing up of the nut further.

In testimony whereof I have hereunto affixed my signature.

PAUL D. THIBERT.